Feb. 22, 1927.
E. W. BELLUCHE
1,618,632
SHEET FEEDER
Filed March 12, 1925      12 Sheets-Sheet 1
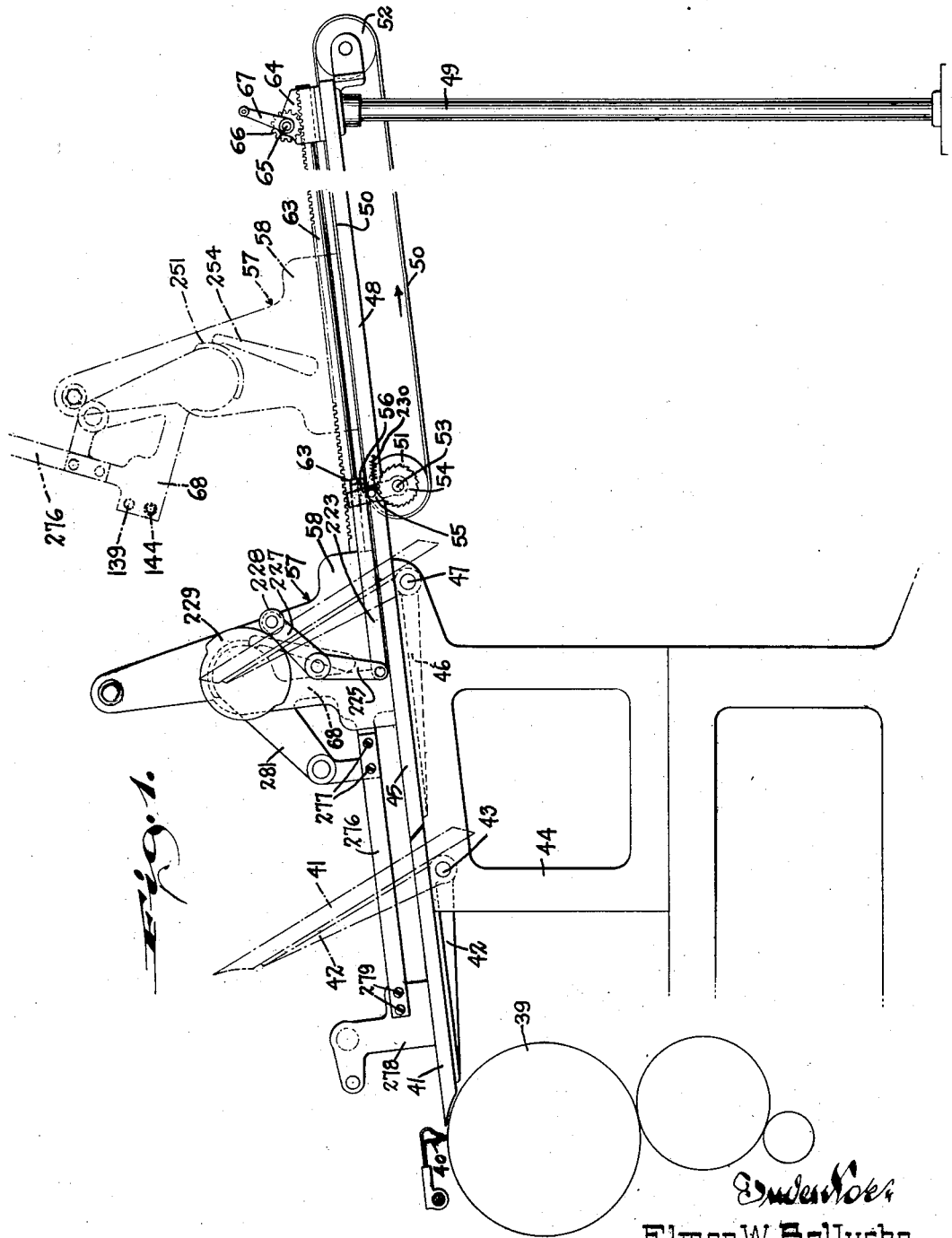

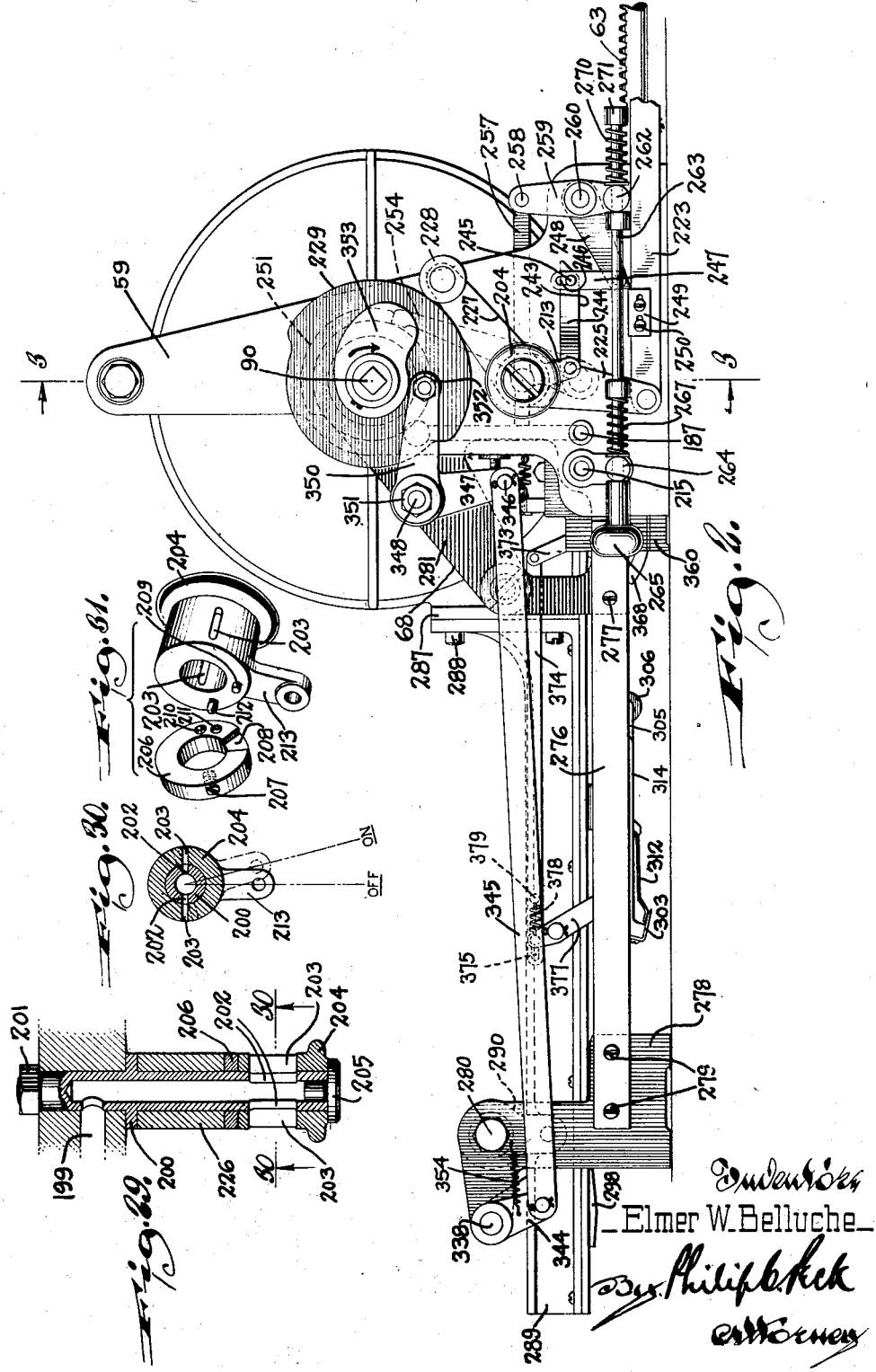

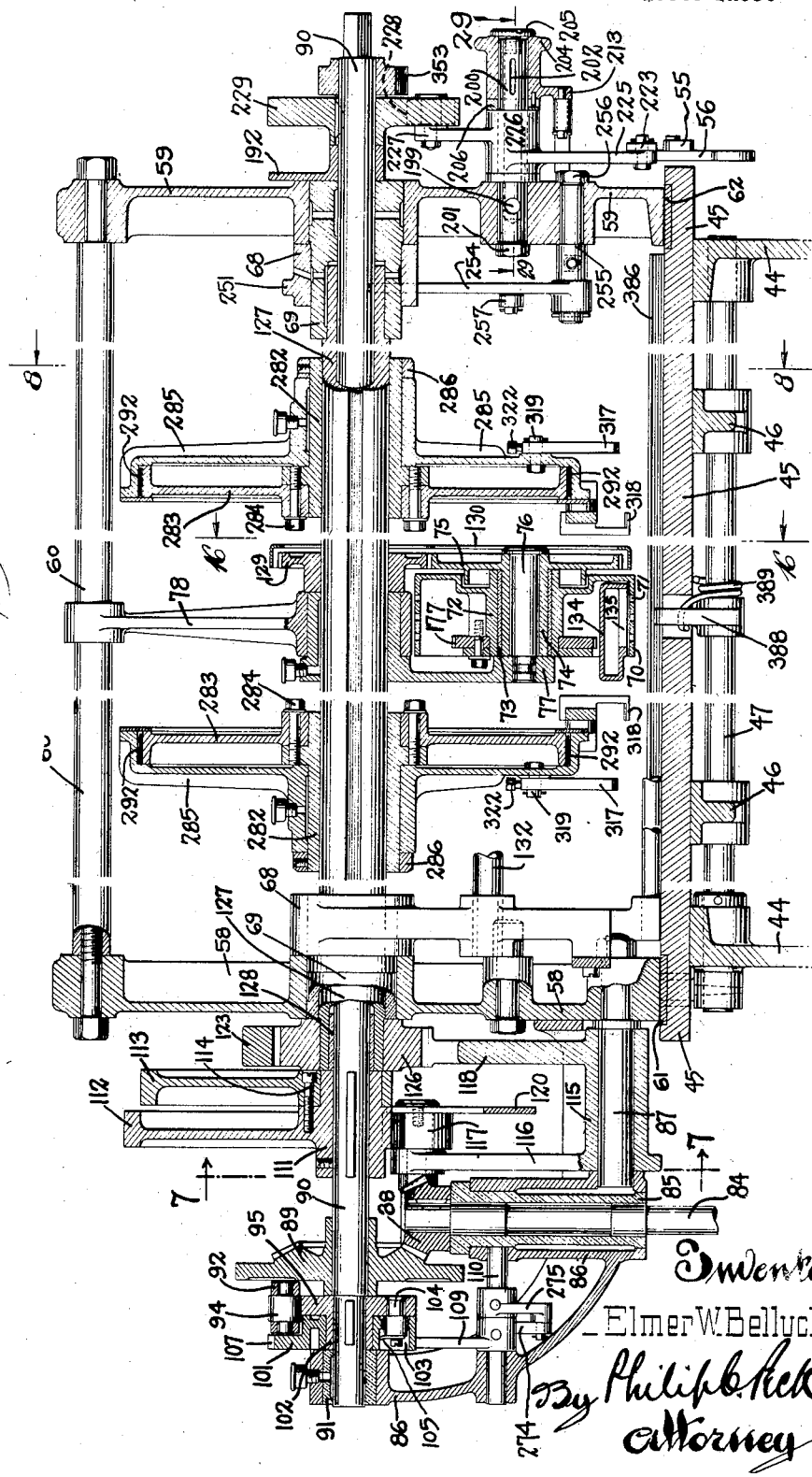

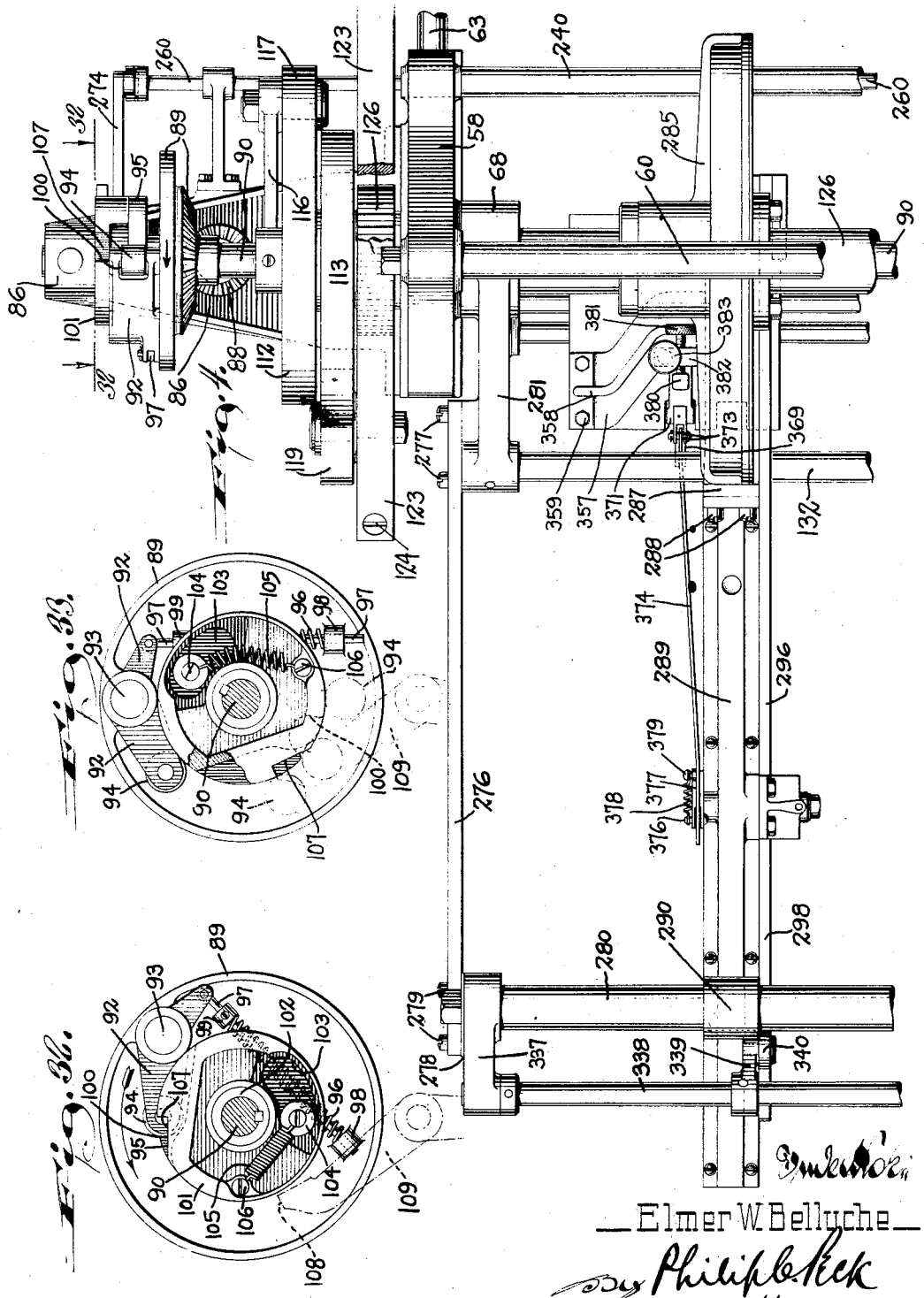

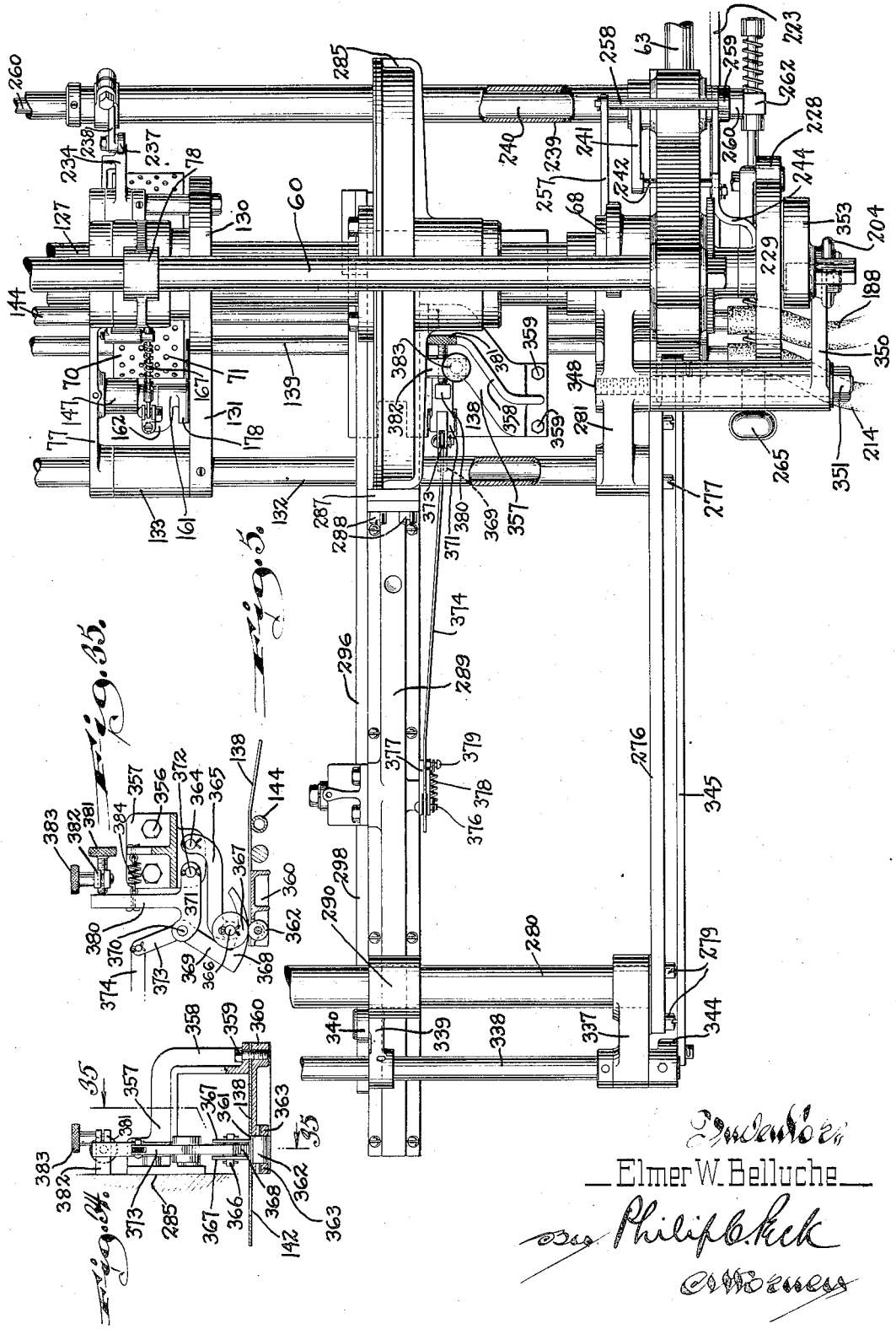

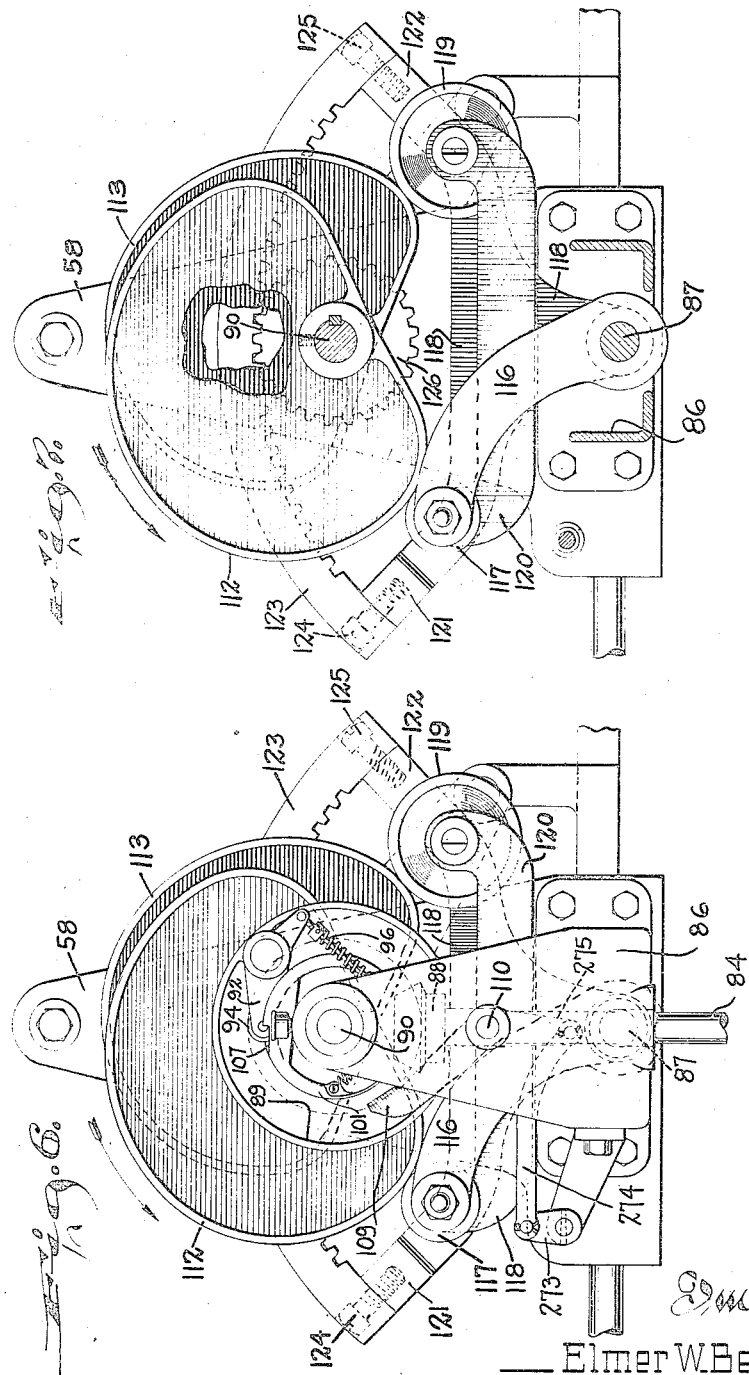

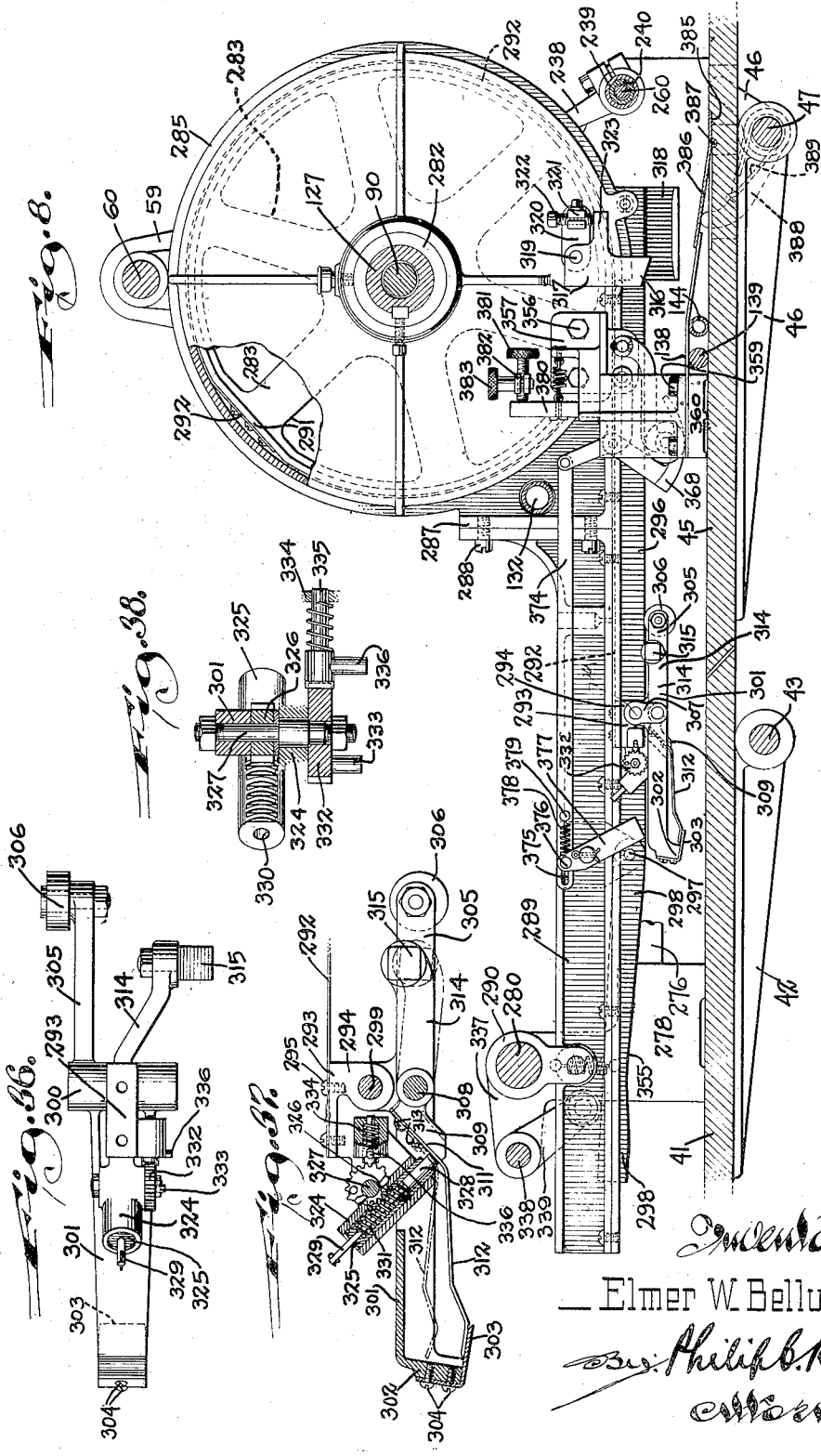

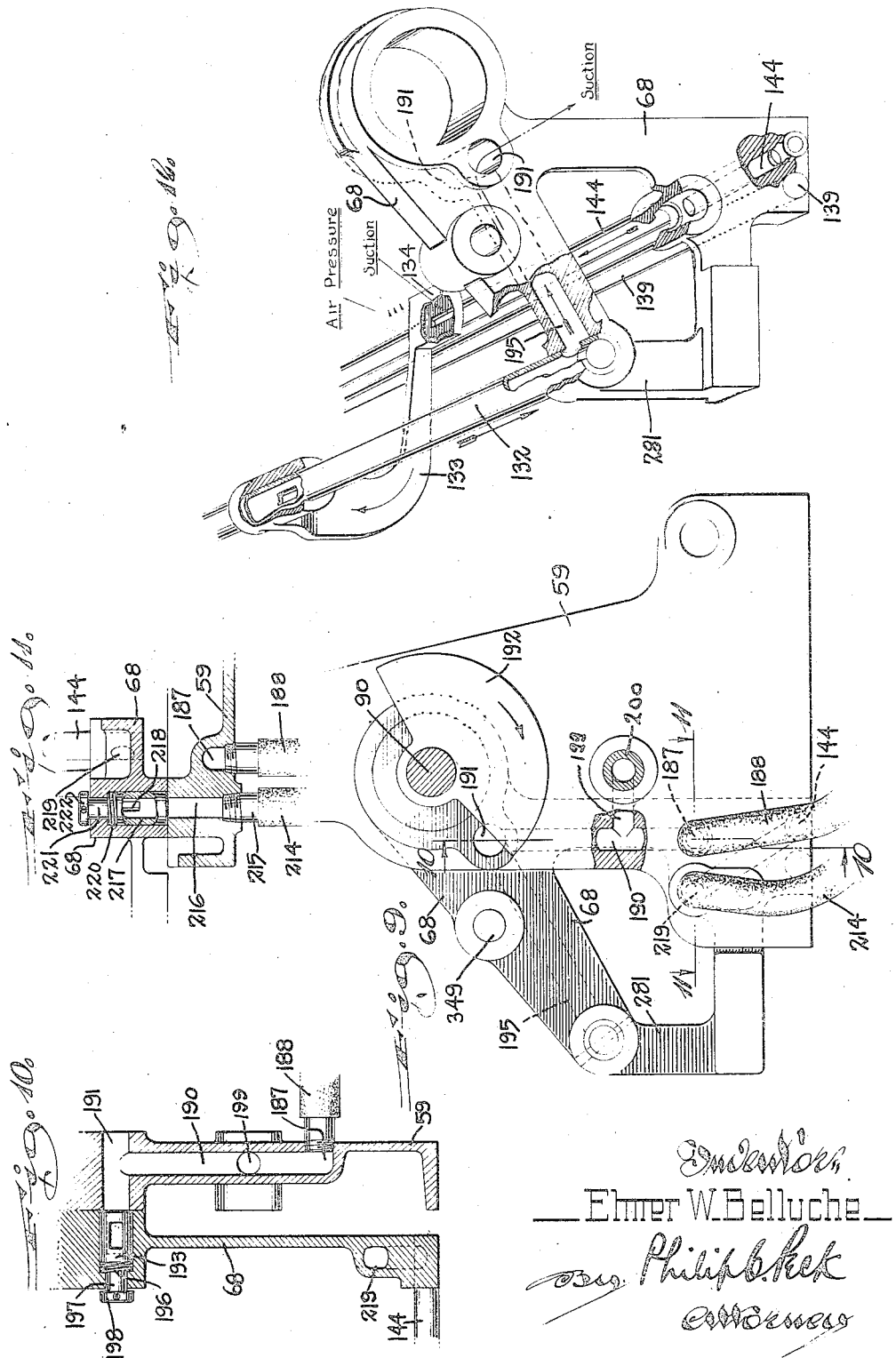

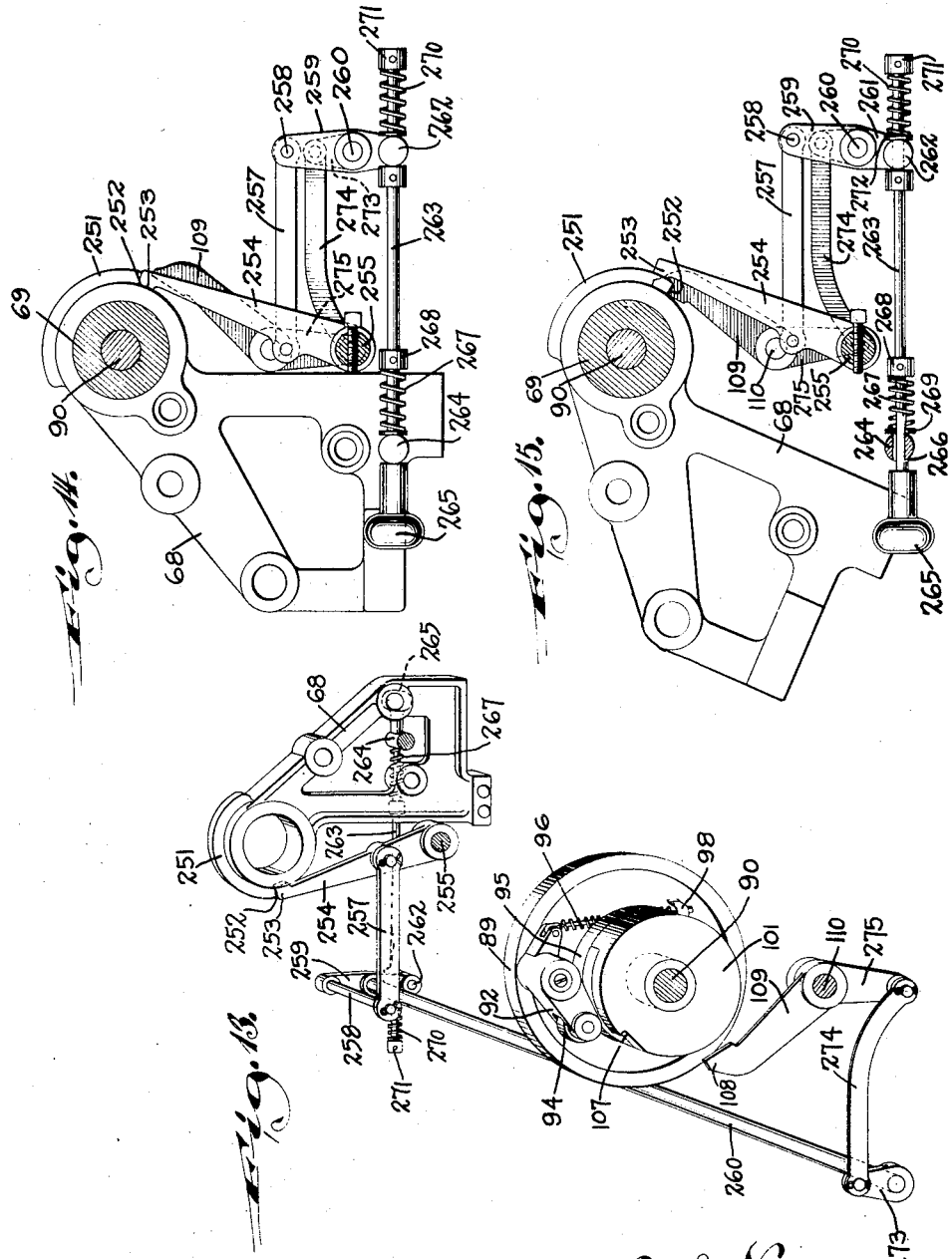

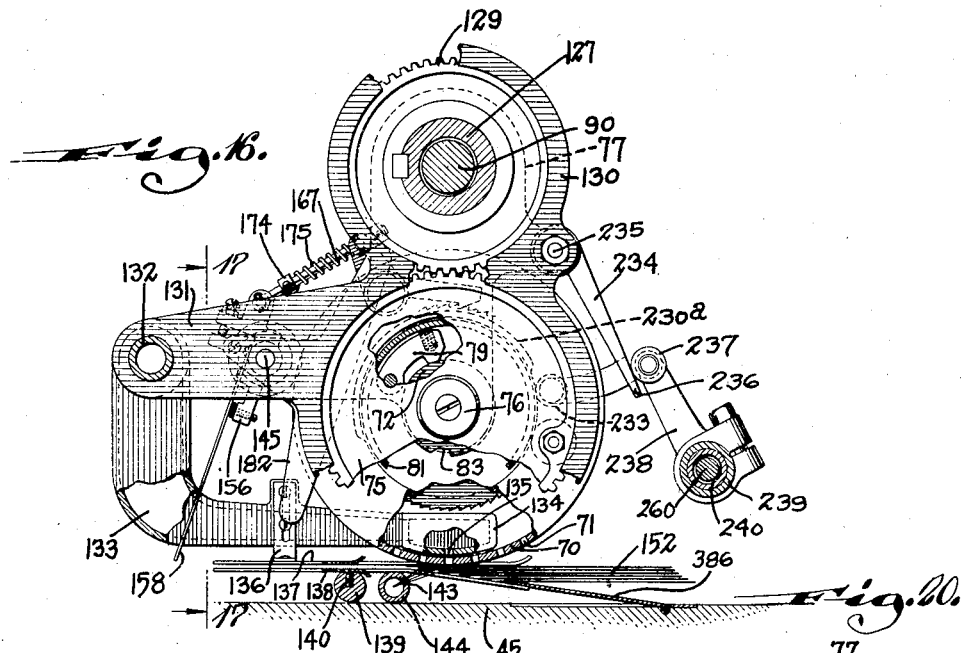
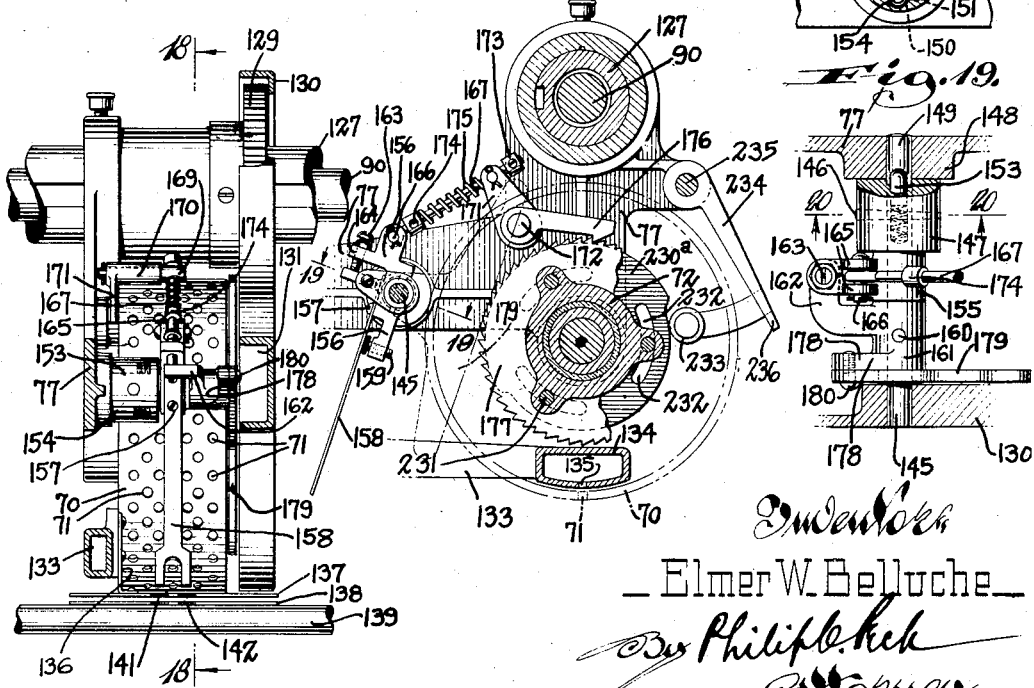

Feb. 22, 1927.
E. W. BELLUCHE
1,618,632
SHEET FEEDER
Filed March 12, 1925
12 Sheets-Sheet 11
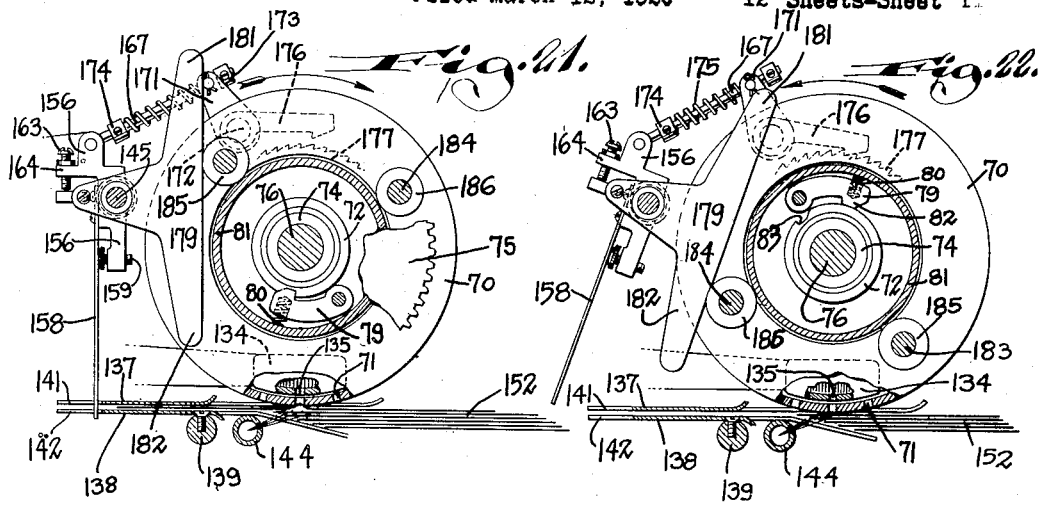
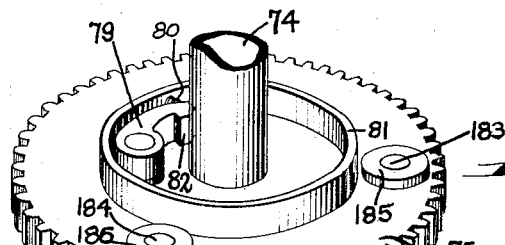
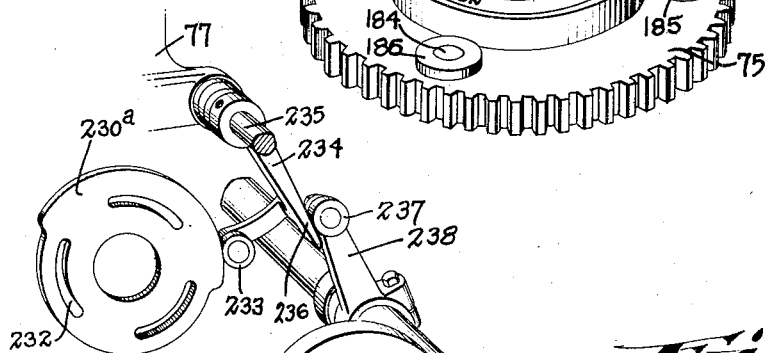
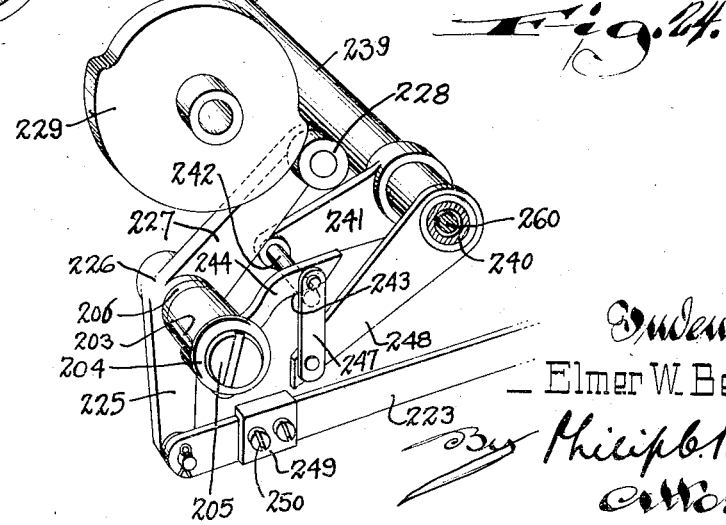
Inventor,
Elmer W. Belluche
By Philip B. Fick
Attorney Feb. 22, 1927.
E. W. BELLUCHE
1,618,632
SHEET FEEDER
Filed March 12, 1925  12 Sheets-Sheet 12
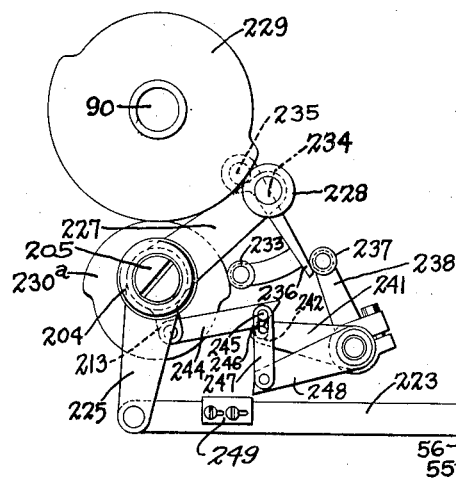
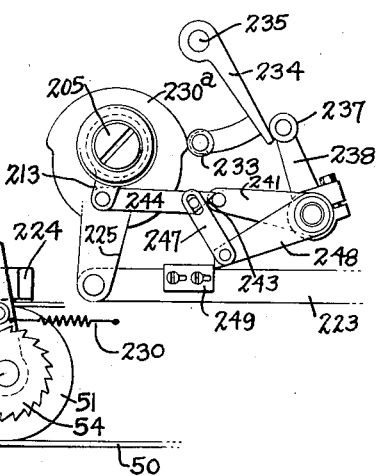
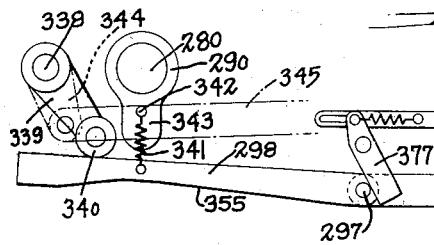
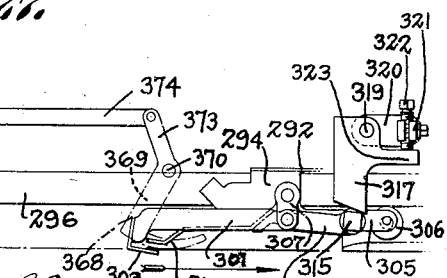
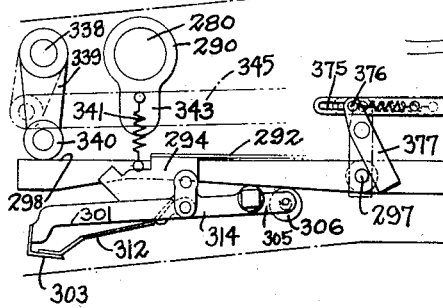
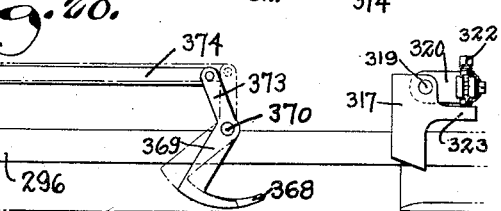
Elmer W. Belluche Patented Feb. 22, 1927.

1,618,632

UNITED STATES PATENT OFFICE.

ELMER W. BELLUCHE, OF RACINE, WISCONSIN, ASSIGNOR TO GEORGE R. SWART & COMPANY, INC., OF NEW YORK, N. Y., A CORPORATION OF NEW YORK.

SHEET FEEDER.

Application filed March 12, 1925. Serial No. 14,991.

My invention relates to machines for separating and feeding successive sheets to a printing-press or other like machine, and I have embodied the novel features of my improvements in a sheet feeder of the type known as "continuous feeders" in which a bank of feathered or fanned-out sheets of paper is gradually carried along the feed board to the separating and feeding devices where the leading ends of the sheets are then acted on by mechanisms for further separating and advancing the individual sheets to a conveyor mechanism which carries such separated sheets, one by one, to the printing press or other machine.

The objects of my invention are, among other things, to embody in a sheet feeder of this class certain novel features in the feeding devices employed for separating and forwarding the individual sheets from the fanned-out bank whereby the construction and operation are simplified and made more certain and effective; also in improved mechanisms for removing or raising the sheet-conveyor frames or parts off the feed-board before the main head of the feeder has been retracted so as to allow the different sections comprising such feed-board to be swung out of their operative alinement with one another, thereby affording a maximum amount of space below the feed-board to aid the operator in making ready on the press or in using the forward sections of the feed-board for feeding the separate sheets by hand.

A further object of my invention is to embody in the feeder an improved form of oscillating suction separating and feeding-off device which may be arranged in pairs across the feeder for successively separating and forwarding the successive sheets, the operation of which is controlled by a cut-out or trip finger located adjacent the conveyor mechanism which finger limits the effective forward movement of the oscillating suction feeding device, coupled with an improved device to hold the cut-out finger lifted out of the path of the advancing sheet after such finger has acted to stop the forward swing of the suction feeding device and also cut off the suction therefrom to release the sheet.

A further object is to provide improved devices in conjunction with the mechanisms for intermittently forwarding the bank of sheets along the feed-board so that when the suction is cut-off from the suction feed-wheel for any reason, the bank feed mechanism is automatically locked by the continued movement of the feeder so as to prevent the bank from being improperly advanced beneath the suction feeding devices while the latter are idle and not separating and feeding the individual sheets.

A further object is to provide associated devices connected with the movable conveyor frames projecting forwardly over the feed-board and with the operating clutch which controls the movements of the feeder so that such conveyor frames cannot be raised out of operative position until the clutch is released from engagement, and furthermore such disengaged clutch cannot be brought into position for operative engagement to start the feeder until the conveyor frames are lowered into their operative position along the feed-board.

A further object is also to provide a novel form of sheet-gripper and reciprocating conveyor mechanism by which the leading edges of the separate sheets moved by the feeding devices beyond the cut-out finger will be seized and advanced to the front stops on the press, coupled with an improved mechanism for imparting a yielding spring pressure on the upper gripper member adjustable for different thicknesses and weight of stock which pressure will gradually diminish as the grippers advance with the conveyed sheet to be delivered in registering position at the front stops ready to be drawn into the press, the path of the grippers being gradually lowered as the sheet is released and then lifted for the return stroke. I have also combined with such gripper-conveyor mechanism a calipering device connected with a member which will act to open the sheet grippers if two or more sheets are seized, such member acting before the grippers approach the front stops which is of advantage to enable the sheets to be removed from the feed-board before they become jammed or clogged in the front stops of the press.

A further object is to provide on the feed-board adjacent the suction feeding devices a transversely hinged plate which is partially raised along with the fanned-out margins of the top sheets by the side-frames of the feeder when the latter are in operative position. Such plate aids in positioning the front margins of the top sheets beneath the suction feeding devices in conjunction with the guide plates, and such plate is lowered to form the top surface of the feed-board when the main head of the feeder is retracted with the side conveyor-frames raised.

My improved sheet-feeder also embodies other advantageous features of novelty and improvement in which the various operating parts embodied therein are greatly simplified in form, arrangement and interaction, and are therefore more sensitive and effective in operation and otherwise better adapted for use, all of which will be hereinafter described and then particularly pointed out in the appended claims.

The accompanying drawings show my improvements in their preferred embodiment in a continuous sheet-feeder; such improvements, however, are not to be restricted to any particularly type of sheet-feeder, as these features of invention may be embodied and used in various forms of feeders with similar advantages and results.

Of the drawings, Fig. 1 is a diagrammatic side elevation of the feeder showing its relation to a printing-press and also some of the improvements embodied in the feeder;

Fig. 2 is a side elevation view of part of the conveyor mechanism and control devices for the bank feed, the view looking from the right of Fig. 3;

Fig. 3 is a vertical sectional view taken on the line 3—3 of Fig. 2 looking in the direction of the arrows;

Figs. 4 and 5 (combined) show top plan views of the sheet separating devices, conveyor mechanism and associated parts;

Fig. 6 is a side elevation view looking from the left of Fig. 3 certain parts being omitted;

Fig. 7 is a sectional elevation taken on the line 7—7 of Fig. 3 looking in the direction of the arrows;

Fig. 8 is a side elevation view partly in section taken on the line 8—8 of Fig. 3 and showing conveyor mechanisms with sheet-gripper and calipering mechanism;

Fig. 9 is a detail side elevation looking from below in Fig. 5 and showing the suction and air blast connections;

Fig. 10 is a detail section taken on the line 10—10 of Fig. 9;

Fig. 11 is a detail section taken on the line 11—11 of Fig. 9 showing the separable air connections when the conveyor frames are raised;

Fig. 12 is a perspective view showing the air pressure and suction pipe connections;

Fig. 13 is a perspective view showing the clutch and its connections with clutch control rod;

Fig. 14 is a detail side elevation showing the clutch in engagement and the conveyor frames lowered;

Fig. 15 is a view similar to Fig. 14 showing the clutch released and locked and the conveyor frames raised;

Fig. 16 is a vertical sectional view of the suction feed wheel and cut-out finger with bank feed control mechanisms on the line 16—16 of Fig. 3;

Fig. 17 is a front elevation of the suction feed-wheel and cut-out finger on the line 17—17 of Fig. 16;

Fig. 18 is a sectional view taken on the line 18—18 of Fig. 17 showing the adjustable cam to control the timing of locking the bank-feed mechanisms;

Fig. 19 is an enlarged section taken on the line 19—19 of Fig. 18;

Fig. 20 is a detail section taken on the line 20—20 of Fig. 19;

Fig. 21 is a detail side elevation, partly in section, showing the suction feed-wheel and cut-out as the wheel begins its forward movement;

Fig. 22 is a view similar to Fig. 21 showing positions of the several parts at the end of the cycle after the sheet has moved the cut-out finger which is thereafter held lifted out of the path of the sheets;

Fig. 23 is a detail perspective view of the drive gear for the suction feed-wheel;

Fig. 24 is a detail perspective view of the cams and their associated devices to control the operation of the bank feed mechanism;

Fig. 25 is a detail side view of bank feed mechanism free to operate and the suction connected with the feed-wheel;

Fig. 26 is a detail view showing the bank-feed mechanism locked and also the suction cut-off from the feed-wheel;

Fig. 27 is a diagrammatic side elevation showing the sheet-grippers opened at the end of the back stroke;

Fig. 28 is a view similar to Fig. 27 but showing the grippers having started on their backward stroke;

Fig. 29 is an enlarged detail sectional view taken on the line 29—29 of Fig. 3 showing the suction control valve;

Fig. 30 is a detail section on the line 30—30 of Fig. 29;

Fig. 31 is a detail perspective view of the suction control valve elements;

Fig. 32 is an enlarged detail sectional view taken on the line 32—32 of Fig. 4 with the clutch in operative engagement;

Fig. 33 is a view similar to Fig. 32 with the clutch disengaged with the finger control in cut-out notch;

Fig. 34 is end view of calipering device partly in section;

Fig. 35 is a side view on the line 35—35 of Fig. 34;

Fig. 36 is a detail top plan view of the sheet-gripper;

Fig. 37 is a sectional elevation of the sheet-gripper; and

Fig. 38 is a detail view of the adjusting devices for varying the pressure of the upper spring finger of the sheet-gripper.

Similar numerals refer to similar parts throughout the several figures.

Referring more particularly to Figs. 1, 3 and 8, the cylinder 39 of a printing-press or other like machine has the front stops 40 arranged above the cylinder 39 in proximity to the forward section 41 of the inclined feed-board, which section 41 is secured to the brackets 42 affixed to the cross-bar 43 journalled in side-frames 44 (only one being shown in Fig. 1). Rearwardly adjacent to section 41 is the feed-board section 45 secured to the brackets 46 affixed to the cross-bar 47 which is also journalled to the side frames 44 as shown in Fig. 3. To the rear of section 45 is the feed-board 48 proper mounted on the standards 49 (only one being shown in Fig. 1), over which board 48 moves a series of feed-tapes 50 passing around suitable pulleys 51 and 52 journalled in suitable brackets secured to the board 48 and standards 49 respectively as shown.

The bank of fanned-out sheets of paper on the feed-board 48 is forwarded to the separating devices hereinafter described by being placed on the tapes 50 passing over the top surface of the feed-board 48. The forward pulley 51 is mounted on the cross shaft 53 which carries the ratchet 54 to be operatively engaged by the pawl 55 pivoted to the rock-lever 56 journalled to the shaft 53, as shown in Figs. 1 and 25. The lever 56 is reciprocated by certain mechanisms hereinafter described to intermittently rotate the pulley 51 and advance the tapes 50 as shown by the arrow in Fig. 1 to forward the bank of sheets to the separating devices as required.

The main head 57 of the feeder comprises the side frames 58 and 59 (Fig. 3) which are held rigidly in vertical position by the tie-bar 60 affixed thereto and extending across the feeder. The flat bottoms of the frames 58 and 59 are adapted to slide on the parallel runway plates 61 and 62 respectively secured to the feed-board 48. To the rear ends of the side frames 58 and 59 are attached the rack-bars 63 (only one being shown in Fig. 1): these rack-bars 63 are similarly constructed and extend rearwardly in substantial parallelism above the feed-board 48 as shown in Figs. 4 and 5. The rear ends of the racks 63 pass through hollow blocks 64 fastened to the feed-board 48 above the standards 49 and the cross-shaft 65 journalled in the blocks 64 carries the gears 66 which mesh with the teeth of the rack-bars 63 as shown in Fig. 1. The shaft 65 may be rotated in either direction by the crank-handle 67 to advance or withdraw the main head 57 sliding on the plates 61 and 62 in the feed-board 48 (Fig. 3).

When the head 57 is to be retracted to the rear position shown by dotted lines in Fig. 1, the sheet conveyor frames 68 pivoted on the tubular bearings 69 secured to the side frames 58 and 59 are first swung upwardly and held in elevated position by mechanisms hereinafter described. Such arrangement, it will be observed, enables the forward sections 41 and 45 forming the movable feed-board resting on the side-frames 44 to be separately lifted out of alinement with one another into their dotted line positions (Fig. 1). It will be seen that a simple and effective mechanism has been provided for advancing and retracting the main head 57 while allowing the pivoted conveyor frames 68 to be raised off the feed-board sections 41 and 45 which may thereafter be separately elevated to give a maximum space for free access to the printing-press cylinder 39 in making ready, or the section 45 may alone be elevated so as to allow the operator to use the section 41 in its full line position as a feed-board when feeding the sheets by hand to the press-cylinder 39.

The mechanism for separating and advancing the individual sheets from the fanned-out bank comprises in the present embodiment the oscillatable suction feed-wheel 70 (Figs. 16–18) which acts to separate and forward the top sheets from the bank until the front or leading edge of the advancing sheet acts to move a cut-out or trip finger which inaugurates the action of devices to stop the forward oscillation of the feed-wheel 70, combined with devices to cut-off the suction from such feed-wheel at predetermined intervals in the cycle of operation to release the sheet to be thereafter seized by the sheet-grippers and conveyed to the front stops 40 above the press-cylinder 39.

Referring more particularly to Figs. 3, 5, 16–23, the feed-wheel 70 having a series of perforations 71 formed in its periphery is journalled with its hub 72 rotating on the bushing 73 mounted on the hub 74 of the gear 75. The hub 74 is journalled on the stubshaft 76 affixed to the wheel bracket 77 which is carried by the depending bracket 78 secured to the tie-bar 60 as shown in Fig. 3. The gear 75 is detachably secured to the wheel 70 by the following devices best shown in Figs. 16, 21, 22 and 23: The inner face of the gear 75 carries the pivoted dog 79 which is urged inwardly toward the hub 74 by the spring 80 bearing on the end of the dog and the annular collar 81 integral with the gear 75. The nose 82 of the dog 79 is adapted to engage removably with the notch 83 cut in the outer surface of the feed-wheel hub 72, Fig. 21 showing the dog 79 engaged with the notch 83 and Fig. 22 showing the dog out of engagement, the gear 75 being free to rotate independently of the wheel 70.

Motion is imparted to the gear 75 to partially rotate same and so oscillate the feed-wheel 70 in each cycle of the machine by the following mechanism best shown in Figs. 3, 4, 5, 6 and 7: The drive shaft 84 journalled in the sleeve 85 in the bracket 86 secured to the side-frame 58 by the tie-shaft 87 is actuated from a suitable source of power. The shaft 84 carries the bevel gear 88 which drives the bevel gear 89 loose on the main cam-shaft 90 supported at its outer end by the bushing 91 secured to the bracket 86 (Fig. 3). The gear 89 is operatively connected with a clutch mechanism best shown in Figs. 3, 4, 6, 13, 32 and 33. The rock-lever 92 is pivotally mounted on the gear 89 at 93, one lever end carrying the roller 94 adapted to bear upon the circular clutch member 95 keyed to the shaft 90 (Fig. 3). The compression spring 96 coiled about the rod 97 pinned to the opposite end of the lever 92 between the collar 98 secured to the gear 89 and the collar 99 adjustably secured to the rod 97 by a set-screw normally maintains the roller 94 in the circular notch 100 cut in the periphery of the clutch member 95 so that the latter is driven by the gear 89; the main cam-shaft 90 keyed to the clutch member 95 thereby is revolved to operate the feeder. The outer clutch member 101 is loosely journalled on the hub 102 of the clutch member 95 (Fig. 3). Projecting into the arcuate slot 103 of the member 101 is the screw pin 104 fastened to the clutch member 95. The pin 104 carries one end of the pull coil spring 105 which is fastened at the other end by pin 106 to the clutch member 101. The clutch member 101 carries the notch 107 cut in its periphery which is adapted to be engaged by the tip 108 of the rock-lever 109 journalled on the stub-shaft 110 secured to the bracket 86 (Fig. 3). When the clutch is operatively connected the tip 108 is maintained adjacent the periphery of the clutch member 101 (Fig. 32) with the roller 94 engaged in the notch 100 through the force of the compression spring 96 when the tip 108 of the rock-lever 109 is swung to the right (Figs. 15 and 33), it is locked in the notch 107 (Fig. 33) and so prevents the clutch member 101 from rotating. The continued rotation of the gear 89 thereupon forces the roller 94 out of the notch 100 and on to the periphery of the clutch member 95 which is thereby shifted relatively to the clutch member 101 against the tension of the spring 105 as shown in Fig. 33 in which the clutch members 95 and 101 are disconnected with the gear-roller 94 riding on the periphery of the clutch member 95 as illustrated in dotted circles in Fig. 33. The hand-controlled mechanisms for operating the rock-lever 109 to connect and disconnect the clutch members at will so as to start or stop the sheet feeding and conveyor devices will be hereinafter described.

Means are provided to oscillate the feed-wheel 70 from the main cam-shaft 90 which is constantly rotated from the power shaft 84 when the feeder is in operation by the mechanisms just described and such means are best shown in Figs. 3, 4, 6 and 7: Keyed to the cam-shaft 90 is the hub 111 of the outer cam 112: adjacent the cam 112 and mounted on the hub 111 is the inner cam 113 secured to the cam 112 by the set-screw 114 in predetermined position (Fig. 3). Journalled on the stub-shaft 87 is the sleeve 115 having integral therewith the rock-arm 116 carrying the pivoted roller 117 which engages the cam 112: also integral with the sleeve 115 is the rock-frame 118 carrying the pivoted roller 119 which engages the cam 113 as shown in Figs. 6 and 7. The rollers 117 and 119 are joined by the connecting bar 120 which is pinned to the pivots of these cam-rollers 117 and 119. The arms 121 and 122 of the rock-frame 118 carry on their ends the segmental rack 123 secured thereto by the screws 124 and 125 respectively. The teeth of the rack 123 mesh with the gear 126 fastened to the rock-tube 127 extending across the feeder and sleeved about the cam-shaft 90 and rotatably supported thereon by the bushing 128 and bearings 69 (Fig. 3). The cams 112 and 113 are so timed with each other as to impart an oscillating movement to the rack 123 which in turn oscillates the rock-tube 127 through the connecting gear 126. The gear 75 is oscillated to and fro by the gear 129 keyed to the rock-tube 127 as shown in Figs. 16 and 17, the gears 75 and 129 being preferably contained within the gear guard 130 having a supporting arm 131 secured to the cross-suction-tube 132 (Figs. 4, 5 and 16) secured in the two conveyor frames 68 on the sides of the feeder.

Suction is applied to the inner face of the rim of the feed-wheel 70 from the suction-tube 132 through the hollow arm 133 having the suction shoe 134 formed at its outer end, which shoe has the transverse slot 135 to register with the perforations 71 of the feed-wheel 70 as shown in Figs. 3, 16, 17 and 18. Adjustably secured to the arm 133 is the slotted bracket 136 carrying the upper slotted guide-plate 137 which is arranged at a suitable distance from the lower slotted guide plate 138 to form a horizontally disposed guide passage for sheets of different thicknesses: the lower plate 138 is fastened to the cross-rod 139 by screws 140 as shown in Figs. 16, 17, 21 and 22. The ends of the rod 139 are secured to the conveyor frames 68 as shown in Fig. 12. The plates 137 and 138 are formed with elongated superposed slots 141 and 142 at their forward ends as shown. The front edges of the sheets forming the fanned-out bank 152 are kept separated by a blast of air from a series of holes 143 cut in the cross-pipe 144 carried by the conveyor frames 68 and connected with any suitable air pump not shown.

Means are provided to arrest the forward movement of the oscillating feed-wheel 70 when the leading edge of the separated topsheet has been advanced between the guide plates 137 and 138 in proximity to the slots 141 and 142 as shown in Fig. 21 which mechanism may be widely varied in structure and operation: In the present embodiment best shown in its details in Figs. 16–22, the rock shaft 145 is arranged between the bracket 77 and the gear guard 130, one end of the shaft 145 being journalled in the guard 130 as shown in Fig. 19; the opposite end of this shaft 145 has secured thereto by the pin 146 the hub 147 which fits against the circular plate 148 integrally formed in the bracket 77; the plate 148 carries two diametrically opposite concave-headed plugs 149 and 150 and similar concave-headed plug 151 adjacent the plug 150 (shown in dotted lines in Fig. 20) which are adapted to be engaged by two oppositely-disposed spring-pressed pins 153 and 154 carried by the hub 147 to adjust the normal position of the shaft 145 as required in fixing the position of the cut-out finger in the guide plates 137 and 138 to secure a variable adjustment of the timing of the cut-out.

Adjacent the hub 147 and loosely journalled on the shaft 145 is the collar 155 carrying the L-shaped bracket 156. Secured to the forward face of the bracket 156 by screws 157 is the flat spring cut-out or trip finger 158 having its lower end forked to pass in its lowered position in the slots 141 and 142; the lower end of the bracket 156 has the cap-screw 159 tapped therein with the head of the screw 159 bearing against the under surface of finger 158 to adjust same. Keyed to the shaft 145 by the pin 160 is the sleeve 161 having the curved arm 162 bearing against the tip of the cap-screw 163 threaded in the lug 164 of the bracket 156. The top of this bracket 156 has the ears 165 formed thereon which carry the cross-pin 166 to which is pivoted the forward end of the rod 167 the upper rear end of which passes slidingly through the hole 168 cut in the cross-pin 169 journalled in the sleeve 170 integral with the rock-arm 171 pivoted to the pin 172 fastened to the bracket 77, as shown in Fig. 17. The outer rear end of the rod 167 carries the adjusting collar 173, and coiled about this rod 167 between the adjustable collar 174 and the pin 169 (Fig. 17) is the compression spring 175 which tends to push the rock-arm 171 clockwise (Figs. 21 and 22) when the cut-out finger 158 has been moved to the left by the advancing separated sheet. Secured to the pin 172 is the rock-pawl 176 adapted to engage the ratchet 177 fastened to the hub 72 of the feed-wheel 70 as shown in Figs. 3 and 18, when the rock-arm 171 is swung from its Fig. 21 to its Fig. 22 position, this engagement causing an immediate cessation of the forward movement of the air-wheel 70 by forcing the pivoted dog 79 out of the notch 83 and so disconnect the gear 75 whenever the leading edge of the sheet actuates the finger 158 to the left out of the guide plate slots 141 and 142. Fig. 21 shows the position of the cut-out finger 158 and its associated parts just as the wheel 70 has started its clockwise revolution with the top sheet between the guide-plates 137 and 138. Fig. 22 shows the position of the same parts at the end of the cycle of the feed-wheel 70 after the top sheet has been advanced to move the cut-out finger 158 out of its path and with the pawl 176 in engagement with the ratchet 177 to arrest the forward revolution of the feed-wheel 70.

The cut-out finger 158 is held out of engagement with the advancing sheet and afterwards reset while the pawl 176 is also disengaged from the ratchet 177 during the reverse rotation of the gear 75 by the following devices best shown in Figs. 16–19 and 21–23: Integral with the sleeve 161 is the straight arm 178 to which is secured the rock-plate 179 by the screw 180. The plate 179 rocks with the shaft 145 and comprises the upper arm 181 and the lower arm 182. Fastened to the inner-side of the gear 75 are the spaced-apart pins 183 and 184 carrying the rollers 185 and 186 respectively which rollers are adapted to engage respectively the arms 182 and 183 of the rock-plate 179 as shown in Figs. 21 and 22 as the gear 75 is normally oscillated by the tube 127. When the roller 186 engages the arm 182 the finger 158 is raised with the spring 175 compressed and forcing the pawl 176 into engagement with the ratchet 177 as shown in Fig. 22. When the gear 75 is reversely rotated in an anti-clockwise direction, the roller 185 engages the upper arm 181 (Fig. 21) and resets the cut-out finger 158 between the slots 141 and 142 while the anti-clockwise movement of the bracket 156 pulls the rod 167 and rock-arm 171 to the left to raise the pawl 176 from engagement with the ratchet 177, the spring 175 on the rod 167 preventing any clashing of the parts during the normal oscillations of the wheel-gear 75, the reverse rotation again bringing the pivoted spring dog 79 into locking engagement with the notch 83.

The sheets from the fanned-out bank 152 adhere to the exterior surface of the feed-wheel 70 through the perforations 71 opposite the suction shoe 134 as shown in Fig. 16, and are separated and advanced by the forward movement of the feed-wheel 70 between the guide plates 137 and 138 as shown in Fig. 21 in position for the leading edges of the sheets to be seized by the sheet-conveyor grippers and carried to the press cylinder 39 by mechanisms hereinafter described.

The mechanism to apply suction to the suction shoe 134 resting on the inner rim of the feed-wheel 70 to pick up the successive top sheets and also to shut off the suction from the shoe 134 after the forward movement of the wheel 70 has been arrested by the engagement of the pawl 176 with the ratchet 177 is best shown in the present embodiments in Figs. 2, 3, 5, 9–12: The side-frame 59 has the port 187 formed therein which is connected by the hose 188 (Figs. 5, 10, 11 and 12) with any suitable air-exhausting device not shown. The port 187 is connected by the passage 190 to the cross port 191 formed in the side frame 59 to be opened and closed alternately by the semicircular plate 192 fastened to the cam-shaft 90 (Figs. 3 and 9). The port 191 is connected to the hollow sleeve 193 slidably carried in the conveyor frame 68, which sleeve 193 has the port 194 registering with the passage 195 leading to the suction-tube 132 which is connected to the hollow arm 133 and suction-shoe 134 when the frames 68 are in lowered position as shown in Figs. 10 and 12. The spring 196 coiled about the stem 197 of the sleeve 193 normally forces the latter against the port 191 (Fig. 10) with the cap 198 limiting the outward movement of the sleeve.

The passage 190 is connected by the passage 199 to the cross-pipe 200 of the hand-mechanisms controlling the suction best shown in Figs. 2, 3, 29, 30 and 31: The pipe 200 is secured on the inner side of the side-frame 59 by the nut 201 (Fig. 29) and has the diametrically-opposite slots 202 cut therein to register with similarly-cut slots 203 formed in the hand knob-barrel 204 rotatably sleeved on the end of the pipe 200 as shown in Figs. 29 and 31. The cap-screw 205 threaded in the outer end of the pipe 200 closes same to atmosphere and holds the barrel 204 snugly against the collar 206 adjustably secured to the pipe 200 by the set-screw 207. The collar 206 has the radial slot 208 cut therein adapted to limit the rocking movement of the barrel 204 by engaging with the pin 209 attached to the inner end of the barrel 204; the outer face of the collar 206 has two holes 210 and 211 adapted to be engaged by the spring-pin 212 slidably secured in the inner end of the barrel 204 as shown in Fig. 31. The barrel 204 also has affixed thereto the arm 213 which actuates certain devices connected with the bank-feed control hereinafter to be described. When the barrel 204 is rocked by hand so that the arm 213 is in its vertical "off" position (Fig. 30), the slots 202 and 203 are in register so as to break the suction by equalizing to atmosphere, while these slots 202 and 203 are out of register when the barrel 204 is rocked to the "on" position shown by dotted lines in Fig. 30 to again make the suction by cutting off the pipe 200 from atmosphere, the spring-pin 212 releasably holding the barrel in either position through its engagement with the holes 210 and 211. By such means the operator can manually control the suction on the wheel 70 during the operation of the feeder.

The revolutions of the valve-plate 192 successively intermit the suction applicable to the suction shoe 134 in suitable timed relation with the oscillations of the feed-wheel 70 in each cycle, and the relative position of such plate 192 on the cam-shaft 90 may be varied by any suitable means to change the timing of such intermitting of the suction to the wheel 70 to pick up the sheets.

Air under pressure is applied to the air-blast pipe 144 by means of the hose 214 connected with the usual air-pump (not shown). The hose 214 is connected to the screw-nozzle 215 (Fig. 11) threaded to the port 216 formed in the side-frame 59. The port 216 is connected to the hollow sleeve member 217 slidably carried in the conveyor frame 68 with the port 218 cut therein leading to the passage 219 connected with the air-blast pipe 144 as shown in Figs. 9, 10 and 11. The compression spring 220 coiled about the stem 221 of the sleeve 217 normally forces the latter against the port 216; the cap 222 on the sleeve stem 221 limits the outward movement of the sleeve 217 in register with the port 216. When the conveyor frames are in their lowered position such air-blast pipe 144 is properly connected: when the frames 68 are lifted such pipe 144 is disconnected as shown in Figs. 1 and 12.

Improved devices are provided in conjunction with the mechanisms for advancing the bank of sheets 152 along the feed-board 48 so that when the suction is cut-off from the suction feed-wheel 70 for any reason the bank feed mechanism is automatically locked by the continued movement of the feeder so as to prevent the sheets comprising the bank 152 from being improperly advanced beneath the feed-wheel while the latter is idle and not separating and advancing the top sheets between the guide-plates 137 and 138 as hereinbefore described.

The bank 152 is advanced by the tapes 50 when the rock-lever 56 carrying the pawl 55 is moved forwardly. Such rock-lever 56 is operatively engaged by the link 223 having the rear end formed with the lug 224 (Fig. 25) which contacts operatively with the end of the lever 56, yet permits the main-head 57 to be racked back free from the bank-feed control mechanisms now to be described. The link 223 is pinned to the lower arm 225 of the rock-lever 226, journalled on the pipe 200 (Fig. 29); the upper arm 227 of the lever 226 carries the cam-roller 228 which is adapted to ride on the cam 229 fast to the main cam-shaft 90 (Figs. 2, 3 and 25). The spring 230 fastened to the feed-board 48 and the rock-lever 56 normally maintains the lever 56 against the lug 224 and also holds the cam-roller 228 on the cam 229.

Referring to Figs. 3, 16, 18, 24–26, the rock-cam 230$^a$ is sleeved on the hub 72 of the feed-wheel 70 and is adjustably secured thereto by set-screws 231 passing through arcuate slots 232 formed in the cam 230$^a$ (Fig. 18) by which the position of the cam 230$^a$ may be varied. Such cam 230$^a$ rotates with the wheel 70 and controls the timing of the devices for locking and unlocking the bank-feed-actuating mechanisms. The cam 230$^a$ engages the cam-roller 233 pinned to the lower end of the rock-lever 234 pivoted to the cross-pin 235 mounted in the bracket 77 (Fig. 18). The roller 233 rides on the cam 230$^a$ by gravity exerted by the weight of the pivoted rock-lever 234 (Fig. 24). Integral with lever 234 is the projection 236 which engages the roller 237 pinned to the arm 238 adjustably mounted on the rock-sleeve 239 enclosing the tie-tube 240 extending across the feeder. Secured to the rock-sleeve 239 is the arm 341 carrying the cross-pin 242 projecting outwardly (Fig. 24) and adapted to ride against the inclined face 243 of the link 244 pivoted to the depending arm 213 carried by the suction-control barrel valve 204 heretofore described (Figs. 29–31). The link 244 carries the stud 245 slidably engaged in the slot 246 formed in the link 247 (Fig. 2) which is pinned to the end of the dog 248 (Fig. 24) journalled on the tie-tube 240. The link 223 carries the locking lug 249 which may be adjustably secured to the link 223 by the screws 250 (Fig. 24), the lug 249 engaging with the tip of the dog 248 when lowered (Fig. 26). Normally the roller 233 rests on the low part of the cam 230$^a$ so as to position the dog 248 thereby preventing the bank from feeding.

When the parts are in the position shown in Fig. 25, the bank-feed mechanism is free to operate in each cycle through the reciprocations of the link 223 as actuated by the cam 229. The cam 230$^a$ is so positioned on the suction wheel 70 that when this wheel starts its forward stroke to separate and advance the top sheet, the roller 233 bears on the low part of the cam 230$^a$ and the dog 248 is in its lowered position to engage the lug 249. If the sheet strikes the cutout finger 158 before the high part of the cam 230$^a$ engages the roller 233, the wheel 70 and cam 230$^a$ stop their forward movement and the bank is prevented from feeding. Should the wheel 70 require more than a predetermined period to feed the sheet to the finger 158, the cam 230$^a$ will revolve far enough to raise the roller 233 and so lift the dog 248 and allow the bank-feed mechanisms to operate. By these devices the bank feed is governed by the length of time or distance required for the feed-wheel 70 to advance the sheet to move the cutout finger 158.

When the suction is cut-off from the feed-wheel 70 by turning the hand-knob barrel valve 204 clockwise, the link 244 is likewise moved to the left to its Fig. 26 position by which the pin 242 will not engage the link 244 and raise same. Hence, when the suction is shut off while the feeder is in operation, the pin 242 will not engage the link 244, though such pin is lifted in each cycle. The dog 248 is lowered by means of the slotted link 247 to the rear of the lug 249 when the roller 233 rides on the high part of the cam 230$^a$ which throws the arm 238 to the right as shown in Fig. 26. By these devices the bank-feed is automatically locked against operation with the cam-roller 228 held out of the low part of the cam 229 by the continued movement of the feeder whenever the operator actuates the hand-knob valve 204 to cut off the suction from the wheel 70. A reverse movement of the valve 204 by which the suction is restored will at once lift the tip of the lock-arm 248 from locking engagement with the lug 249 to bring the parts to their Fig. 25 position with the bank-feed free to operate in the normal operation of the feeder as has been hereinbefore described.

The mechanisms by which the sheet-conveyor frames 68 and associated parts are raised and lowered from the forward sections 41 and 45 of the feed board before the main-head 57 is retracted combined with devices for operating the clutch members 95 and 101 which control the movements of the feeder whereby such conveyor frames 68 can not be raised from their lowered operative position until the clutch is released, and further whereby the disengaged clutch can not be again connected to start the feeder until the conveyor frames are again lowered and locked on the feed-board are best shown in the present embodiment in Figs. 1, 3, and 12–15. The two frames 68 on either side of the feeder are journalled on the bearings 69 secured to the side-frames 58 and 59. The right-hand frame 68 (Fig. 3) carries the segmental runway 251 terminating at its lower end with the notch 252 (Fig. 13) which is engaged by the nose 253 of the rock-arm 254 pivoted to the stub-shaft 255 (Fig. 3) secured in the side-frame 59 by the nut 256. The arm 254 is connected by the link 257 to the pin 258 projecting inwardly from the rock-lever 259 (Figs. 13 and 14) which is mounted on one end of the bar 260 journalled within the tie-tube 240 (Figs. 4 and 5) extending across the feeder. The lower arm 261 of the lever 259 carries the apertured block 262 through which passes the clutch control slide-rod 263 and extends forwardly through the bearing 264 and terminates in the handle 265. The rod 263 adjacent the handle 265 has the notch 266 formed in its under side (Fig. 15) to engage the bearing 264 when pulled forwardly from its Fig. 14 to its Fig. 15 position thereby compressing the spring 267 coiled about the rod 263 between the fixed collar 268 and sliding collar 269. The rod 263 has the spring 270 coiled about its rear end between the fixed collar 271 and the sliding collar 272 adjacent the block 262. The force of the spring 270 holds the nose 253 in the notch 252 (Fig. 14) or in close engagement with runway 251 (Fig. 15), depending on the position of the frames 68. The other end of the rock-bar 260 carries the arm 273 (Figs. 4 and 13) connected by the link 274 to the lower arm 275 of the rock-lever 109 pivoted on the stub-shaft 110 (Fig. 3) secured in the bracket 86, the tip 108 of the lever 109 being normally held out of the notch 107 (Fig. 13) when the clutch members 95 and 101 are operatively engaged as heretofore described, Fig. 14 also showing the tip 108 retracted: However, when the operator pulls out the handle 265 and locks the rod 263 in its Fig. 15 position by the notch 266 engaging the bearing 264, the arm 254 is retracted with its nose 253 disengaged from the notch 252 and simultaneously the clutch is released by the tip 108 of the rock-lever 109 engaging with the notch 107 on the periphery of the clutch member 101 as shown in Fig. 33. The retractive movement of the arm 254 unlocks the conveyor frames 68 and enables same to be lifted with the nose 253 of the arm 254 riding on the runway 251 as shown in Fig. 15. The upward movement of the conveyor frames 68 cuts off the suction and air-blast from the feeder proper as shown in Figs. 9–12 inclusive. Likewise on the reverse movement of the frames 68 when about to be lowered into operative position the operator releases the slide-rod 263 and the spring 267 in turn actuates the rock-lever 109 to release the clutch member 101 to allow same to come into operative engagement with the clutch member 95 after which the nose 253 of the arm 254 will pass down the runway 251 into locking engagement with the notch 252 to lock the conveyor frames 68 in their operative Fig. 14 position with the suction and air-blast connections restored as shown in Figs. 10 and 11.

The mechanism for gripping the successive sheets by their leading edges lying between the guide-plates 137 and 138 and thereafter for conveying the separate sheets so seized by the grippers to the front stops 40 is best shown in the present embodiment in Figs. 2, 3, 4, 5, 8, 27, 28 and in detail in Figs. 34–38. I preferably arrange two sets of grippers and sheet-conveyor devices on either side of the feeder: as each set of grippers and their operating mechanisms which are devised to operate in unison are duplicates of each other in structure and operation, a description of one set will be sufficient. Referring to Figs. 4 and 5, the conveyor frames 68 on either side of the feeder carry the forwardly extending conveyor bars 276 rigidly secured thereto by cap-screws 277 and to the supporting standards 278 by cap-screws 279, the standards 278 resting on the feed-board section 41 (Fig. 2) when the conveyor-frames 68 are in their lowered operative position. The two standards 278 are rigidly connected by the transverse tie-bar 280. The forward brackets 281 of the conveyor frames 68 carry the ends of the suction tube 132 as shown in Figs. 4, 5 and 12. Referring to Figs. 3 and 8, the hubs 282 of the sheet-conveyor wheels 283 are keyed to the rock-tube 127, the wheels 283 being removably secured to the hubs 282 by cap-screws 284 (Fig. 3). Journalled on the hubs 282 are the wheel housings 285 held in position by the adjustable end collars 286. The forward ends of the housings 285 are formed with vertical face plates 287 to which are secured by cap-screws 288 the rear ends of the gripper runway-frames 289 as shown in Figs. 2, 4, 5 and 8. The front ends of the gripper runway-frames 289 are affixed to the collars 290 mounted on the tie-bar 280. By these devices the wheel housings 285 and gripper run-way frames 289 are held together in position on the feed-board when the feeder is in operation, yet they may be swung upwardly as a unit as shown in dotted lines in Fig. 1 when it is desired to clear the front end of the feed-board sections 41 and 45 and retract the main head 57. Referring to Fig. 8, the wheels 283 have a flat segment 291 formed in their periphery to which is screwed the rear-end of the flexible forwarding bands 292 preferably formed of sheet steel; the bands 292 pass around the peripheries of the wheels 283 inside the circular rims of the housings 285 (Figs. 3 and 8) and extend forwardly to the flat top 293 of the sheet-gripper carriage 294 to which the band ends are secured by two screws 295 (Figs. 8 and 37). Secured to the under side of the frames 289 are the gripper runways 296 having pinned thereto at 297 the forward cam runways 298 as shown in Figs. 8, 27 and 28. As the wheels 283 are oscillated by the rock-tube 127 (in the present embodiment a movement of about 220 degrees), the gripper carriages 294 connected to the wheels 283 by the flexible steel bands 292 are reciprocated to and fro over the feed-board to intermittently forward the successive sheets to the press-cylinder 39 with a resiliently yielding connection between the oscillating wheels 283 and gripper carriages 294 due to the flexibility of the bands 292.

Referring more particularly to Figs. 8, 36, 37 and 38, the gripper carriage 294 carries the cross-pin 299 on which is journalled the collar 300 of the frame plate 301 the forward end 302 having the rigid lower gripper finger 303 secured thereto by screws 304 (Figs. 8 and 37). Projecting rearwardly from the collar 300 is the horizontal arm 305 carrying the pivoted roller 306 which is adapted to engage the runways 296 and 298 (Fig. 8) to control the path of the reciprocating gripper carriage 294 over the feed-board sections 41 and 45. Mounted on the pin 299 is the depending bracket 307 (Fig. 8) carrying the pivot-pin 308 on which is mounted the rock-lever 309. The forward end 310 of the rock-lever 309 is formed with an inclined face 311 to which the flexible upper gripper finger 312 is secured by screws 313. The finger 312 is preferably formed of a strip of flat steel to make a resilient yielding seizure of the sheet in conjunction with the lower finger 303. The rear arm 314 of the rock-lever 309 carries the transversely extended block 315 (Fig. 36) which is adapted to coact with the beveled face 316 of the plate 317 to open the grippers by raising the upper finger 312 to its dotted line position (Fig. 37) when the rear ends of the gripper carriages 294 are moved to the limit of their rear stroke within the guides 318 secured to the ends of the runways 296 (Figs. 3 and 8). The plate 317 is pivoted to the pin 319 carried by the bracket 320 secured to the wheel housings 285 (Fig. 3). The bracket 320 carries a split collar 321 in which the cap-screw 322 is threaded, the point of the screw 322 being adapted to bear on the lug 323 integral with the plate 317 to adjust the position of the bevel face 316 so as to accommodate the opening of the sheet gripper fingers 303 and 312 for sheets of different thicknesses.

Referring to Figs. 36, 37 and 38, I have provided a device for varying the pressure of the upper spring finger 312 on the lower rigid finger 303 for sheets of different textures and thicknesses. The frame plate 301 carries the inclined hollow barrel 324 in which is slidably contained the rack sleeve 325 which engages the pinion 326 fastened to the cross-pin 327 pivoted in the plate 301. Within the sleeve 325 is the slidable plug 328 which is adapted to bear on the spring finger 312 adjacent the screws 313 as shown in Fig. 37; the plug 328 has the stem 329 extending through the hole 330 formed in the top of the rack sleeve 325, and coiled about the stem 329 within the sleeve 325 is the compression spring 331 bearing yieldingly on the rear end of the plug 328. Affixed to the pin 327 is the toothed wheel 332 having the handle 333; adjacent the wheel 332 is the barrel 334 fastened to the carriage 294 and within the barrel 334 is the spring pin 335 adapted to engage with the teeth of the wheel 332 to hold the latter in any predetermined position. The spring-pin 335 to be retracted so that the wheel 332 may be rotated by the handle 333 to revolve the pinion 326 to shift the rack-sleeve in the barrel 324 to vary the pressure of the spring plug 328 on the finger 312 to attain an exceptionally delicate adjustment of the co-acting fingers 303 and 312 in seizing and holding the leading edges of the successive sheets advanced thereby. Such pressure adjustment is of advantage in gripping sheets of different thicknesses.

Means are provided (preferably in duplicate as shown in part in Figs. 4 and 5) in connection with the mechanism for advancing and retracting the gripper carriages 294 along the runways 296 and 296 whereby the pressure of the sheet grippers on the sheets will gradually diminish as the carriages 294 advance with the conveyed sheet toward the front stops 40 with the path of the sheet-grippers gradually lowered as the sheet is brought into position and released; thereafter the gripper carriages 294 are quickly lifted for the return stroke with the gripper pressure restored in readiness for the seizure of the next sheet. Such means in the present embodiment are best shown in Figs. 2, 4, 5, 8, 27 and 28: The standards 278 carry at either end the brackets 337 in which is journalled to the rock-shaft 338 (Fig. 2) to which is affixed the depending arm 339 carrying the roller 340 which is adapted to bear on the top surface of the cam-runway 298 (Figs. 27 and 8); the pull spring 341 connecting the runway 298 with the pin 342 on the bracket 343 of the collar 290 fastened to the tie-bar 280 holds this runway 298 in running contact with the roller 340. The rock-shaft 338 also has mounted on one end (Fig. 5) the rock-arm 344 to which is pinned the link 345 pivoted to the pin 346 carried by the rock-arm 347 journalled on the stub-shaft 348 threaded in the hole 349

(Figs. 5 and 9) of the right-hand conveyor frame 68 (Figs. 2 and 5). The lever arm 350 held on the shaft 348 by the nut 351 has pinned thereto the cam-roller 352 which is adapted to engage and ride on the cam 353 fastened to the end of the cam-shaft 90 by the force of the pull spring 354 pinned to the arm 344 and standard 278 as shown in Fig. 2. This cam 353, revolving clockwise as shown in Fig. 2, is so timed with relation to the reciprocating movements of the gripper carriage 294 that the gripper is lowered by the roller 306 riding on the cam-runway 298 (Fig. 28). When the gripper reaches the end of its forward movement, the arm 339 is forced to its vertical position when the link 345 is moved to the left as the roller 352 rides over the high part of cam 353. This lower runway 298 (Fig. 28) raises the gripper so that it will not interfere with the sheet alined against the front stops during its backward movement. In the forward movement of the gripper when the roller 306 rides on the runway 298, the carriage 294 travels in the same plane of movement as the band 292. Each carriage 294 carries the pressure spring 331 for the gripper. As the roller 306 engages the runway 298 the end 302 carrying the finger plate 303 is lowered which causes the finger 312 to lower with it due to the pressure of the spring 331 which pressure is simultaneously diminished so that the gripper fingers may readily slide off the front edge of the sheet alined against the stops 40. In Figs. 27 and 28 the dot and dash lines show the approximate path of the grippers during their forward movement when carrying the successive sheets. As soon as the sheet is released the link 345 and arm 339 are quickly moved to the left to their Fig. 28 position for the return stroke of the carriage 294 with the gripper-fingers 303 and 312 opened toward the end of the stroke when the block 315 engages the bevel face 316 the plate 317 to open the grippers ready to seize the separated sheet resting on the guide plate 138.

I have also embodied with the sheet-gripper and conveyor mechanisms just described a calipering device connected with a gripper-opening member pivotally carried by the conveyor frames 289 which calipering device will inaugurate the action of devices to open the fingers 303 and 312 if a plurality of overlapped sheets have been separated and sized by the grippers in any cycle, such member acting to release the sheets before the grippers approach or reach the front stops 40 to enable such overlapped sheets to be removed from the feed-board sections 41 and 45 before such sheets become jammed or clogged in the front stops 40 or press-cylinder 39. Such calipering device in the present embodiment is best shown in Figs. 2, 4, 5, 8, 27 and 28 and in detail in Figs. 34 and 35. As such calipering device and associated mechanisms are duplicates on either side of the feeder, a description of the construction and operation of one set will be sufficient. Affixed to the wheel housing 285 by cap-screws 356 is the bracket 357 having the depending arm 358 to which is secured by cap-screws 359 the guide plate 138 and supporting bracket 360 (Figs. 34 and 35) which rests on the board section 45 as shown in Fig. 8 to hold the housings in position. The guide plate 138 has the slot 361 formed therein within which slot is arranged the roller 362 pivoted in the lugs 363 of the bracket 360, the peripheral surface of the roller 362 being flush with the top surface of the guide plate 138. Pinned at 364 to the bracket 357 is the rock-arm 365 carrying at its outer end the cross-pin 366 to which are loosely journalled the spaced-apart wheels 367 adapted to bear by gravity on the under roller 362 as shown in Fig. 34 to hold the sheets flat on the guide plate 138 adjacent the caliper. The caliper 368 is in the form of a segment arranged on the rock-lever 369 pivoted on the pin 370 secured to the bracket 371 pivoted to the pin 372 on the bracket 357. The caliper segment 368 is arranged between the wheels 367 (Fig. 34 and 35), and the upper arm 373 has pinned thereto the link 374 having its forward end slotted at 375 to engage the pin 376 mounted on the gripper-opening member 377 pivoted to the side of the conveyor runway frame 289. The pull spring 378 secured to the pin 376 and the pin 379 carried by the link 374 normally holds the pin 376 at the rear end of the slot 375, as shown in Fig. 8.

The caliper 368 has associated therewith means to secure a delicate adjustment in relation to the roller 362 for sheets of different thickness and texture by mechanisms comprising an upright arm 380 integral with the bracket 371 which arm bears against the tip of the adjusting screw 381 tapped in the split collar 382 fastened to the housing 285, where the screw 381 is held in any fixed position by the binding screw as shown in Figs. 8, 34 and 35. The pull spring 384 secured to the bracket 357 and arm 380 holds the latter in yielding contact with the adjusting screw 381.

In operation as the single sheets are successively carried between the roller 362 and wheels 367 along the guide plate 138 the caliper 368 is adjusted to rock forwardly only to a slight extent which oscillations are taken care of by the lost motion slotted connection between the link 374 and the pin 376, the spring 378 restoring the pin 376 to its right-hand position in the slot 375 as shown in Figs. 8 and 27, as the caliper 368 assumes its normal vertical position through gravity. However, should the sheet-gripper fingers 303 and 312 take two or more overlapped sheets simultaneously, the caliper 368 would be swung forwardly to its dotted line position (Fig. 28), thereby straightening the gripper opening-member 377 so as to bring its lower end in horizontal alinement with the block 315 on the gripper carriage 294. As soon as the block 315 strikes this opening-member 377, the gripper fingers 303 and 312 are immediately opened to release the overlapped sheets midway on the feed-board sections 41 and 45 which sheets may be removed by the operator while the gripper carriage 294 completes its forward stroke toward the front stops 40.

Referring to Figs. 3, 8 and 16, the top surface of the feed-board section 45 is preferably formed above the cross-bar 47 with the transverse depression 385 into which is fitted the plate 386 hinged at 387 to the section 45 along the rear edge of the plate. The cross-bar 47 has the finger 388 journalled thereto, and adjacent the finger 388 is the spring 389 coiled about the bar 47 with one end bearing on the under side of the section 45 while the other end is hooked to the finger 388. The tip of the finger 388 bears yieldingly on the under side of the plate 386 the forward edge of which rests on the rear edge of the guide plate 138. When the plate 386 is held in its partially raised position by means of the finger 388, such plate partially supports the front margins of the top sheets of the bank 152 (Fig. 16), and also aids in positioning such sheets beneath the feed-wheel 70 in conjunction with the lower guide plate 138. After the main-head 57 is retracted with the upraised conveyor frames 68 as hereinbefore described (Fig. 1), such plate 386 may be lowered on the hinge 387 to form a part of the top surface of the feed-board section 45.

The operation of my sheet-feeder is substantially as follows: When the bank of fanned-out sheets 152 is lying on the feed-board 48 with the top margins resting on the hinged plate 386 and guide plate 138, the suction applied to the suction shoe 134 through the perforations 71 of the feed-wheel 70 picks up the top sheet, the air blasts from the pipe 144 tending to separate the front edges of the top sheets (Fig. 16). As the wheel 70 is rotated in a forward clockwise direction by the oscillating gears 75 and 129 actuated by the rock-tube 127, the top sheet is separated and advanced between the guide plates 137 and 138 as shown in Fig. 21 until the leading edge contacts with the cut-out or trip finger 158 which normally hangs vertically with its forked end in the slots 141 and 142. The advancing sheet moves finger 158 to the left (Figs. 21 and 22) which movement immediately throws the pawl 176 into locking engagement with the ratchet 177 secured to the wheel 70 as has been hereinbefore described. Such pawl and ratchet engagement causes the pivoted dog 79 to ride out of the notch 83 on the hub 74 and so disconnects the wheel 70 from its actuating gear 75 which completes its normal oscillation to the position shown by the rollers 185 and 186 in Fig. 22 with the arm 182 swung to the left to hold the cut-out finger raised from the path of the sheet. As the gear 75 is reversely rotated the dog 79 is brought back into engagement with the notch 83 to oscillate the wheel 70 in its backward idle stroke, which movement also lifts the pawl 176 from the ratchet 177 and resets the cut-out finger in its Fig. 21 position through the engagement of the roller 185 with the arm 181 as has been heretofore described.

As the advanced sheet is brought between the guide plates 137 and 138, the gripper carriages 294 have reached the limit of their back stroke as shown in Fig. 27. Then the wheels 283 begin their forward oscillations with the flexible bands 292 carried in the housings 285 causing the carriages 294 to be moved forwardly over the feed-board sections 41 and 45 with the rollers 306 in rolling contact with the runway 296; when the gripper carriages 294 approach the end of their forward movement, the rollers 306 reach the pivoted cam runway 298 which is then lowered as shown in Fig. 28 by the action of the cam 353; as the roller 306 runs along the runway 298, the pressure of the gripper fingers 303 and 312 on the sheet is gradually relaxed as heretofore described because the roller 306 moves along the inclined cam surface 355 of the lowered runway 298, such fingers sliding off the sheet as the gripper carriage 294 ends its forward movement; the dot and dash lines in Figs. 27 and 28 show diagrammatically the approximate path of the sheets as they are conveyed to the front stops 40. At the end of the forward stroke the cam runways 298 are quickly lowered by the action of the cam 353 and the reverse rotation of the wheels 283 carries the gripper carriages 294 back to their Fig. 27 position. Should two or more sheets be seized, the calipering device heretofore described will open the sheet-grippers 303 and 312 before they reach the front stops 40 and as soon as the block 315 strikes the gripper-opening member 377 which has been swung to its vertical dotted line position shown in Fig. 28 through the forward movement of the caliper 368 as shown by dotted lines.

The foregoing constructions embody the essential principles of my invention as a preferred embodiment in a continuous sheet-feeder, but various changes may be made in the structural details and in the types of sheet-feeders in which such constructions are installed, for example, a pile-feeder, without departing from the scope of my improvements. However the foregoing is sufficient to disclose the underlying principles and advantages as particularly applied to a sheet-feeder of the continuous type.

I claim as my invention:—

1. In a sheet-feeder a feed-board, a main head slidably supported thereon, sheet-conveyor frames pivoted to said main head and means to lock said frames when lowered to their operative position on the feed-board.

2. In a sheet-feeder a feed-board, a main head slidably supported thereon, sheet-conveyor frames pivoted to said main head and means to lock said frames against movement when lowered to their operative position on the feed-board.

3. In a sheet-feeder a feed-board, a main head slidably supported thereon, sheet-conveyor frames pivoted to said main head and means to lock said frames against a lifting movement when lowered to their operative position on the feed-board.

4. In a sheet-feeder a feed-board, a main head slidably supported thereon, sheet-conveyor frames pivoted to said main head and means for automatically locking said frames when lowered to their operative position on the feed-board.

5. In a sheet-feeder, a feed-board comprising a plurality of movable sections, a main head slidably supported on said sections when in surface alinement, and means to advance and withdraw the main head only on said alined sections but allowing said sections to be raised after the head is in retracted position.

6. In a sheet-feeder, a feed-board comprising a plurality of longitudinally movable sections, a main head slidably supported on said sections when in surface alinement, and means to advance and withdraw the main head only on said alined sections but allowing said sections to be raised after the head is in retracted position.

7. In a sheet-feeder, a feed-board comprising a plurality of transversely pivoted longitudinally movable sections, a main head slidably supported on said sections when in surface alinement, and means to advance and with-draw the main head only on said alined sections but allowing said sections to be raised after the head is in retracted position.

8. In a sheet-feeder, a feed-board comprising a plurality of movable sections held in surface alinement, a main head slidably supported on said sections, means to advance and with-draw the main head only on said alined sections, and means to move each of said sections separately after the main head is retracted.

9. In a sheet-feeder, sheet-feeding devices, clutch members connecting said devices with a source of power, means for engaging and releasing said clutch members, sheet-conveyor frames locked in operative position while said clutch members are engaged, and means for unlocking said conveyor frames and releasing said clutch members whereby said frames may be thereafter moved into inoperative position.

10. In a sheet-feeder, sheet-feeding devices, clutch members connecting said devices with a source of power, manual means for engaging and releasing said clutch members, sheet-conveyor frames coacting with said feeding-devices locked in operative position while said clutch members are engaged, and means for unlocking said conveyor frames and releasing said clutch members whereby said frames may be thereafter moved into inoperative position.

11. In a sheet-feeder, a feed-board, sheet-feeding devices, a clutch connecting said devices with a source of power, means for engaging and releasing said clutch, sheet-conveyor frames extending over said feed-board, means for locking said frames when lowered on said feed-board in operative position while said clutch is engaged, and means for locking said conveyor frames and releasing said clutch members whereby said frames may be thereafter moved into inoperative position off said feed-board.

12. In a sheet-feeder, a feed-board, sheet-feeding devices, a clutch connecting said devices with a source of power, means for engaging and releasing said clutch, sheet-conveyor frames extending over said feed-board, means for automatically locking said frames when lowered on said feed-board in operative position while said clutch is engaged, and means for locking said conveyor frames and releasing said clutch members whereby said frames may be thereafter moved into inoperative position off said feed-board.

13. In a sheet-feeder, sheet-feeding devices, a clutch connecting said devices with a source of power, means for engaging and releasing said clutch sheet-conveyor frames movable into and out of operative position, and independent means to hold said clutch released while said conveyor frames are out of operative position.

14. In a sheet-feeder, sheet-feeding devices, a clutch connecting said devices with a source of power, means for engaging and releasing said clutch sheet-conveyor frames movable into and out of operative position, and independent means to hold said clutch released while said conveyor frames are out of operative position but automatically bringing said clutch into engagement when said frames are moved into operative position.

15. In a sheet-feeder, sheet-feeding devices, a clutch connecting said devices with a source of power, means for engaging and releasing said clutch sheet-conveyor frames movable into and out of operative position, and independent means to hold said clutch released while said conveyor frames are out of operative position but automatically bringing said clutch into engagement when said frames are moved into operative position through the continued movement of the feeder.

16. In a sheet-feeder, sheet-feeding devices, a clutch connecting said devices with a source of power, means for engaging and releasing said clutch, sheet-conveyor frames coacting with said feeding devices and movable into and out of operative position therewith, means for automatically locking said frames when in operative position, and means to hold said clutch released when said conveyor frames are unlocked and moved out of operative position.

17. In a sheet-feeder, sheet-feeding devices, a clutch connecting said devices with a source of power, means for engaging and releasing said clutch, sheet-conveyor frames movable into and out of operative position, and manually-operated means to hold said clutch released while said conveyor frames are out of operative position.

18. In a sheet-feeder, sheet-feeding devices, a clutch connecting said devices with a source of power, means for engaging and releasing said clutch sheet-conveyor frames movable into and out of operative position, and manually-operated means to hold said clutch released while said conveyor frames are out of operative position but brought into engagement when said frames are moved into operative position through the continued movement of the feeder.

19. In a sheet-feeder, an oscillatable feed-member, coacting rock-gears for oscillating said member in both directions, sheet-conveying devices, and means directly connected with said rock-gears for actuating said conveying devices in timed relation with said feed-member.

20. In a sheet-feeder, an oscillatable feed-member, coacting rock-gears for oscillating said member in both directions, sheet-conveying devices, and means comprising a flexible member connected with said rock-gears and conveying devices for actuating said conveying devices in timed relation with said feed-member.

21. In a sheet-feeder, an oscillatable feed-member, means for positively oscillating said member in both directions, sheet-conveying devices, and means directly connected with said rock-gears for actuating said conveying devices in timed relation with said feed-member.

22. In a sheet-feeder, an oscillatable feed-member, means for positively oscillating said member in both directions, sheet-conveying devices, and means comprising a flexible member connected with said rock-gears and conveying devices for actuating said conveying devices in timed relation with said feed-member.

23. In a sheet-feeder, sheet-conveying devices provided with grippers, and means for imparting a gradually diminishing spring pressure on the grippers while lowering said devices during the forward movement of said conveying devices.

24. In a sheet-feeder, sheet-conveying devices provided with grippers, means for yieldingly reciprocating said devices to convey successive sheets, and means for imparting a gradually diminishing spring pressure on the grippers at the end of the forward movement of said conveying devices.

25. In a sheet-feeder, a feed-board, sheet-conveying grippers reciprocatable over said feed-board, and means to relax gradually the tension of the grippers on the sheet while simultaneously lowering same during the end of their forward movement.

26. In a sheet-feeder, a feed-board, sheet-conveying grippers reciprocatable over said feed-board, and means to lower and relax the tension of the grippers on the sheet at the end of their forward movement.

27. In a sheet-feeder, a feed-board, sheet-conveying grippers reciprocatable over said feed-board, and means to simultaneously lower and relax the tension of the grippers on the sheet at the end of their forward movement.

28. In a sheet-feeder, a feed-board, sheet-conveying grippers reciprocatable over said feed-board, means comprising a yielding flexible connection for actuating said grippers, and means to relax gradually the tension of the grippers on the sheet during the end of their forward movement.

29. In a sheet-feeder, a sheet-feeding devices, sheet-conveying grippers to advance the successive sheets from said feeding devices, means for actuating said conveying grippers in timed relation with said feeding-devices, and means to lower and relax gradually the tension of said grippers on the sheet during the end of their forward movement.

30. In a sheet-feeder, sheet-feeding devices, sheet-conveying grippers to advance the successive sheets from said feeding devices, means comprising a yielding connection with said feeding devices for actuating said conveying grippers in timed relation with said feeding-devices, and means to relax gradually the tension of said grippers on the sheet during the end of their forward movement.

31. In a sheet-feeder, sheet-feeding devices, sheet-conveying grippers to advance the successive sheets from said feeding devices, means comprising a yielding connection with the feeding devices for actuating said conveying grippers in timed relation with said feeding-devices, and means to lower and relax the tension of said grippers on the sheet at the end of their forward movement.

32. In a sheet-feeder, sheet-feeding devices, sheet-conveying grippers to advance the successive sheets from said feeding devices means comprising a yielding connection with said feeding devices for actuating and conveying grippers in timed relation with said feeding-devices, and means to simultaneously lower and relax the tension of said grippers on the sheet at the end of their forward movement.

33. In a sheet-feeder, front stops, sheet-conveying devices provided with grippers to seize the sheet and forward same to said front stops, means for imparting a variable spring pressure on the grippers gradually diminishing during their forward movement, and means for lowering said grippers before the sheet is alined against said front stops.

34. In a sheet-feeder, front stops, sheet-conveying devices provided with grippers to seize the sheet and forward same to said front stops, means for yielding reciprocating said grippers to and from said front stops, means for imparting a variable spring pressure on the grippers gradually diminishing at the end of their forward movement.

35. In a sheet-feeder, front stops, sheet-conveying devices provided with grippers to seize the sheet and forward same to said front stops, means for yielding reciprocating said grippers to and from said front stops, and means to lower and relax the tension of the grippers on the sheet when delivering same to the front stops.

36. In a sheet-feeder, front stops, sheet-conveying devices provided with grippers to seize the sheet and forward same to said front stops, and means to simultaneously lower and relax the tension of the grippers on the sheet when delivering same to the front stops.

ELMER W. BELLUCHE.